United States Patent Office 3,030,376
Patented Apr. 17, 1962

3,030,376
PREPARATION OF 4-METHYLIMIDAZOLE FROM GLUCOSE
Robert W. Liggett, Mountain Brook, and Harmon L. Hoffman, Jr., Homewood, Ala., assignors to Atlas Chemical Industries, Inc., a corporation of Delaware
No Drawing. Filed Mar. 21, 1960, Ser. No. 16,167
2 Claims. (Cl. 260—309)

This invention relates to an improved method for the production of 4-methylimidazole. More specifically, the invention concerns a process wherein 4-methylimidazole is produced from dextrose.

The product of the present invention is useful as a curing agent for epoxy resins and as a convenient source of starting material for the production of various imidazole derivatives useful as curing agents and stabilizers for epoxy resins.

In general, the present invention relates to a process for producing 4-methylimidazole in good yield by reacting together a mixture of dextrose, formaldehyde, ammonium ions and zinc carbonate at a temperature of at least 60° C. In the initial reaction, the dextrose starting material is decomposed and a complex zinc salt of 4-methylimidazole is precipitated from the reaction mixture. The zinc is then removed from the zinc 4-methylimidazole complex leaving free 4-methylimidazole. A method of removing the zinc, which has been found to be satisfactory in carrying out the present invention, is by forming a slurry of the zinc-4-methylimidazole complex with water and treating the resultant slurry with hydrogen sulfide. The zinc salt precipitate is thereby decomposed rendering a solution of free 4-methylimidazole and a zinc sulfide precipitate. The 4-methylimidazole solution is then separated from the zinc sulfide by mechanical means, the solution condensed and the 4-methylimidazole product recovered by known methods, such as extraction with a suitable water immiscible solvent, and purified by vacuum distillation.

The quality of the dextrose starting material employed in the present invention may vary from reagent to commercial grade. It has been found that a comparatively wide variation of dextrose purity in the starting material results in substantially no difference in the quality or quantity of the product.

In carrying out the invention, it has been found that formaldehyde in the form of formalin may ably be utilized in the reaction. If it is desired, formaldehyde in other concentrations or precursors of formaldehyde such as paraformaldehyde or hexamethylene tetramine may be utilized to carry out the invention.

Ammonium ions in the reaction of this invention, are preferably supplied in the reaction in the form of aqueous ammonia. If it is desired, other sources of ammonium ions such as mixtures of ammonium carbonate, or ammonium acetate, with ammonium hydroxide may be utilized to carry out the process of the present invention.

Although the zinc carbonate material suited to use in the present invention may be a reagent grade, it has been found that materials readily available from the usual chemical sources of supply and known as "zinc carbonate" or "basic zinc carbonate" are eminently satisfactory.

Prior art methods of producing 4-methylimidazole from dextrose utilize zinc hydroxide in the reaction. Windaus, A., and Knoop, F., Ber. 38, 1166 (1905); Weidenhagen, R., and Hermann, R., Z. Wintschafts Zuckerind, 85, 126 (1935); Parrod, J., Bull Soc. Chim. France (4), 53, 196 (1933), and Bernhauer, K., Z. Physiol. Chem., 183, 67 (1929). Zinc hydroxide is not available as an article of commerce. It is a compound that is most difficult to prepare. Particularly it is difficult to prepare a zinc hydroxide which does not contain ions which interfere with the present reaction, for example chloride and sulfate ions, and which is soluble in ammonia. Numerous attempts were made to compound a zinc hydroxide suited to use in the reaction of the invention. None of the various zinc hydroxides that were compounded gave consistent yields of 4-methylimidazole, whereas the use of zinc carbonate gives a consistent and dependable yield of between about 40 and about 60% of the zinc-4-methylimidazole complex based on the weight of dextrose starting material.

The preferred mol ratio of the reactants is about 30 mols of ammonium ions, to 2 mols of zinc carbonate, to 3 mols of formaldehyde, to 2 mols of dextrose. Consistent high yields of 4-methylimidazole are obtained when the foregoing preferred ratio is utilized. Slightly lower percentage yields of the zinc-4-methylimidazole complex, based on the weight of dextrose, are obtained when the amounts of dextrose or dextrose and formaldehyde in the preferred ratio are doubled. The weight increase of the zinc-4-methylimidazole product that may be obtained in the foregoing cases is often not economically justified because of yield-decreasing side reactions of the increased dextrose component or because of the increased quantity of reactants which must be expended.

The initial reaction of this invention may be carried out at temperatures ranging from about 60° C. to about 115° C. and appears to be substantially independent of pressure conditions. In the preferred embodiment of the invention, the initial reactants are heated together at atmospheric pressure to a temperature of 60° C. over a time period of about 1 hour. The temperature is then permitted to rise at the same rate to about 70° C. and this temperature held constant for approximately 3 hours. At the end of that time the formed zinc complex is decomposed by treatment with hydrogen sulfide; the formed zinc sulfide separated from the solution by filtration; and the solution condensed. The resultant solution of 4-methylimidazole is then purified and concentrated by extraction with a suitable solvent such as chloroform and separated by a vacuum distillation.

For the purpose of illustrating the invention more fully, the following example is given:

*Example*

76 g. of zinc carbonate (0.6 mol) were added to an aqueous solution of 600 ml. of ammonium hydroxide (8.9 mols) and the mixture stirred until the zinc carbonate was substantially entirely dissolved. With constant stirring of the mixture 85 ml. of formalin (37%) (0.95 mol) were added to the zinc carbonate-ammonium hydroxide mixture. The reaction mixture was then completed by the addition of 100 g. of dextrose (0.55 mol). Gentle heating of the reaction mixture was started as soon as the dextrose was dissolved. With constant stirring the reaction mixture was heated to 60° C. over a time period of 1 hour. It was noted that a zinc salt complex began to precipitate out of the reaction mixture at about this point. Once the precipitation started, it appeared to be complete in approximately 10–20 minutes. With constant stirring, the reaction temperature was allowed to increase at the previous rate until a temperature of 70° C. was reached. This temperature was then maintained for 5 hours, and the reaction mixture constantly stirred over this period. The zinc salt complex was then separated by filtration, dried and weighed. The dried zinc salt complex was found to weigh 38.7 g. and represented a yield, based on the weight of the dextrose starting material of 60.5%.

The above procedure was repeated using twice the amount of each of the reactants. The weight of the dried zinc salt complex was found to be 73.5 g. and represented a yield, based on the weight of the dextrose starting material, of 57.4%.

The above described procedure was again repeated, ths time using 8 times the amount of each of the reactants plus 800 g. additional of dextrose. The reactants were heated together over a period of 6.5 hours. The weight of the dried zinc salt complex was found to be 545.0 g. and represented a yield, based on the weight of the dextrose starting material of 53.3%.

The zinc salt complex from each of the above reactions was combined and the mixture slurried with water. The slurry was then saturated with hydrogen sulfide for approximately 3 hours at a temperature of 65–70° C. The resulting product was allowed to cool and the formed zinc sulfide was separated by filtration. The filtrate, containing free 4-methylimidazole in an aqueous solution was then evaporated under a vacuum for approximately 2 hours to remove any dissolved hydrogen sulfide remaining in the solution. The 4-methylimidazole was then extracted from the aqueous mixture with chloroform. The chloroform-4-methylimidazole product was then distilled at 0.2 mm. of mercury at 120–130° C. pot temperature. 4-methylimidazole of high purity was recovered.

What is claimed is:

1. In a process of preparing 4-methylimidazole by reacting dextrose with ammonium ions and formaldehyde in the presence of a zinc compound to produce a zinc complex, treating the complex to remove the zinc, and recovering 4-methylimidazole, the improvement of using zinc carbonate as the zinc compound and carrying out the said reaction at a temperature between about 60° C. and about 115° C.

2. The process described in claim 1 wherein the proportions of the reagents are such that for each mol of dextrose there is used about 7.5 to about 15 mols of ammonium ions, about 1.5 mols of formaldehyde and from about 0.5 to about 1.0 mol of zinc carbonate.

References Cited in the file of this patent
UNITED STATES PATENTS 2,728,763   Mamalis et al. _____ Dec. 27, 1955

FOREIGN PATENTS 183,588   Germany _____ Apr. 15, 1907

OTHER REFERENCES

Windaus et al.: Ber. Deut. Chem., vol. 38, pages 1166–70 (1905).
Windaus: Ber. Deut. Chem., vol. 40, pages 799–801 (1907).
Parrod: Chem. Absts., vol. 27, page 2955 (1933).
Elderfield: Heterocyclic Compounds, vol. 5, pages 211–12 (1957).